United States Patent
Eyring et al.

(10) Patent No.: US 10,490,003 B2
(45) Date of Patent: Nov. 26, 2019

(54) GUEST MODE ACCESS

(71) Applicant: Vivint, Inc., Provo, UT (US)

(72) Inventors: Matthew J. Eyring, Provo, UT (US); Jeremy Bruce Warren, Draper, UT (US)

(73) Assignee: Vivint, Inc., Provo, UT (US)

( * ) Notice: Subject to any disclaimer, the term of this patent is extended or adjusted under 35 U.S.C. 154(b) by 0 days.

(21) Appl. No.: 14/986,059

(22) Filed: Dec. 31, 2015

(65) Prior Publication Data

US 2017/0193720 A1    Jul. 6, 2017

(51) Int. Cl.
  *G05B 19/00*   (2006.01)
  *G07C 9/00*    (2006.01)
  *G06Q 10/02*   (2012.01)

(52) U.S. Cl.
  CPC ........ *G07C 9/00166* (2013.01); *G06Q 10/02* (2013.01); *G07C 9/00817* (2013.01); *G07C 9/00904* (2013.01)

(58) Field of Classification Search
  CPC ............ G07C 9/00166; G07C 9/00904; G07C 9/00817; G06Q 10/02
  USPC ........................................ 340/10.1
  See application file for complete search history.

(56) References Cited

U.S. PATENT DOCUMENTS

| | | | |
|---|---|---|---|
| 7,689,446 B2 | 3/2010 | Sagar | |
| 9,130,934 B2 | 9/2015 | Warrick et al. | |
| 9,659,483 B2 * | 5/2017 | Sager .............. | G01N 33/0004 |
| 9,734,644 B2 * | 8/2017 | Samad ............. | G07C 9/00079 |
| 2003/0149576 A1 * | 8/2003 | Sunyich ............ | G06Q 30/02 |
| | | | 705/5 |
| 2008/0122575 A1 * | 5/2008 | Lavian .............. | G05B 15/02 |
| | | | 340/3.1 |
| 2009/0070155 A1 | 3/2009 | Zonnefeld | |
| 2009/0299777 A1 | 12/2009 | Silberman | |
| 2010/0191551 A1 | 7/2010 | Drance et al. | |
| 2013/0024222 A1 * | 1/2013 | Dunn ................ | G07C 9/00571 |
| | | | 705/5 |
| 2013/0088320 A1 * | 4/2013 | Black ............... | G06Q 10/06 |
| | | | 340/5.6 |
| 2013/0229259 A1 * | 9/2013 | Huang .............. | G07C 9/00563 |
| | | | 340/5.52 |
| 2014/0267112 A1 | 9/2014 | Dunn et al. | |
| 2015/0170448 A1 * | 6/2015 | Robfogel ........... | G07C 9/00904 |
| | | | 340/5.61 |
| 2015/0348049 A1 * | 12/2015 | Todasco ............ | G06Q 10/02 |
| | | | 705/5 |
| 2017/0054652 A1 | 2/2017 | Baker et al. | |
| 2017/0132909 A1 * | 5/2017 | Rabb ................ | G08B 29/18 |

OTHER PUBLICATIONS

Chesky, B., Tweet with comment dated Dec. 25, 2016 7:08PM, Twitter.

* cited by examiner

*Primary Examiner* — Dhaval V Patel
(74) *Attorney, Agent, or Firm* — Holland & Hart, LLP

(57) ABSTRACT

The present disclosure relates to a method for security and/or automation systems. In some embodiments, the method may include receiving a reservation request for a reservation at a building from a guest. The method may further include approving the reservation request. The method may further include automatically communicating a temporary guest code to the guest based at least in part on the approving, the temporary guest code granting access to the building and access to operate at least one component of the security and/or automation system.

21 Claims, 7 Drawing Sheets

GUEST MODE ACCESS

BACKGROUND

The present disclosure, for example, relates to security and/or automation systems, and more particularly to providing temporary guest codes to afford limited access to one or more components of the security and/or automation systems for approved guests.

Security and automation systems are widely deployed to provide various types of communication and functional features such as monitoring, communication, notification, and/or others. These systems may be capable of supporting communication with a user through a communication connection or a system management action.

Currently, when a homeowner wishes to allow a guest to access his home in his absence, the homeowner must physically provide a key to the guest, which may raise security issues should the guest lose or fail to return the key. In the alternative, the homeowner may provide the guest with an access code to the home, which the guest must keep track of in order to gain access to the home, but which may also present security issues should the guest retain or distribute that code. Some home security systems may allow for creation of guest access codes, but may require that the homeowner both manually activate the code prior to the guest's arrival, and deactivate the guest code after the guest's departure. Additionally, these guest access codes may be limited to providing access to a door to the home or other rented building. There is lacking a method by which a guest may be granted access both to a home and to one or more components of a security and/or automation system associated with the home, automatically and remotely, and a method by which that access may be automatically revoked at the conclusion of the guest's stay, without the need for direct homeowner intervention.

SUMMARY

Online private home rental programs have become increasingly popular, yet the logistics of granting guests access to the home and to components of the home automation and/or security system remain complicated; some homeowners may employ rental companies to facilitate transfers of keys and security codes, while other homeowners may choose to stay in or nearby the home in order to provide keys and security codes to guests personally, and to ensure that the home is properly secured after the guests depart. It may be desirable, therefore, to provide a method for automatically granting guests access at the beginning of their reservations, and automatically revoking access at the conclusion of their reservations. The present disclosure provides such a method, the method including receiving a reservation request for a reservation at a building from a guest, and approving the reservation request. The method may further include automatically communicating a temporary guest code to the guest based at least in part on the approving, the temporary guest code granting access to the building and access to operate at least one component of the security and/or automation system.

The described methods may be particularly useful, for example, for online private home rentals. For example, a guest may submit a reservation request online for a homeowner's home for a particular set of dates. The homeowner may approve the reservation request, for example using a dedicated application associated with a home security and/or automation system. In other examples, the application may automatically approve the reservation request by comparing the request with the homeowner's calendar, and verifying payment. Upon receiving approval of the reservation, the home automation system may automatically communicate a temporary guest code to the guest, for example in the form of a text message or email message, or as a push notification from a dedicated application, for example on the guest's smartphone. In some examples, the temporary guest code may be communicated to the guest immediately upon reservation confirmation, whereas in other examples, the temporary guest code may be communicated to the guest at the start of the reservation, or at some point in time there between.

The temporary guest code may be associated with the home automation and/or security system, and may accordingly provide predetermined, limited access to the home and security bypasses for the guest during his or her stay. For example, the guest code may provide access to the front door of the home, but may not allow the guest to access the garage. The guest code may also serve to alert the home automation system that a guest is in the home, as opposed to a homeowner, and various functionalities of the home automation system may be impacted by this status. For example, a thermostat or irrigation system in the home, linked to the home automation system, may be locked upon detection of the guest code, such that the guest may not alter the settings.

In some examples, use of the guest code to access the home may initiate predetermined settings by the homeowner. For example, a homeowner may prerecord an audio, video, and/or text message for the guest, welcoming the guest and providing information for the guest's stay. Upon detection of the guest code, the home automation system may automatically communicate the prerecorded message to the guest, for example at a control panel, or on the guest's personal phone or computing device. In other examples, use of the guest code to access the home may initiate other home automation system functionalities, such as turning on lights, adjusting the temperature of the home, shutting off security cameras and motion sensors, and the like. Each of these guest code-triggered home automation system functionalities may be determined based upon homeowner-inputted preferences. In some examples, use of the guest code may trigger the home automation system to communicate an alert to the homeowner. For example, a video monitor may record the guest approaching the home, and a live stream or captured image may be communicated to the homeowner to notify him that the guest has arrived. In other examples, the homeowner may receive a notification from the home automation system, for example in the form of a text message or push notification from a dedicated application, alerting him that the guest has viewed his prerecorded welcome message.

The guest may also use the same or a different guest code to "check out" of the home at the end of his stay. In some examples, use of the guest code at the end of the reservation, or use of a separate "guest checkout" code may result in an alert being sent to the homeowner to notify him that the guest has checked out. Additionally, use of the checkout code may cause the home automation and/or security system to switch to an "armed away" or "vacation" status, which may trigger increased security parameters, energy saving modes for HVAC and irrigation systems, and the like.

The guest code may expire at the conclusion of the reservation, such that the guest may not regain access to the home after his reservation has ended. In some examples, the guest may input a request, for example at a dedicated application on his personal computing device or at a control panel associated with the home automation system, for an extension of his guest code, for example where he needs a late checkout or wishes to extend his stay by a day or more. This request may be communicated to the homeowner by the home automation system, and the homeowner may remotely approve or deny the request. In other examples, the request may be approved or denied locally at the home automation system. Depending on the homeowner's response, the home automation system may extend the operability of the guest code for the approved duration of time, may provide the guest with a new code, or may do neither in the event that the guest's request for an extension is denied.

In some examples, use of the "guest checkout" code may also trigger an alert to be communicated to a cleaning crew, to notify them that the home is ready to be cleaned now that the guest has departed. This alert may be accompanied by a temporary "cleaning crew code," to allow the cleaning crew limited access to the home to clean the home. The homeowner may be notified when the cleaning crew has received this alert and code, and may be notified when the cleaning crew utilizes the code to enter the home to clean it, and/or to exit the home after the job has been completed. This "cleaning crew code" may also automatically expire, for example, after a period of four hours or any suitable, predetermined duration of time. In this way, the homeowner may stay apprised of the status of his home remotely and automatically, and the logistics of rental of the home may be carried out without the need for his direct intervention.

Although described above with respect to codes inputted at a control panel or door lock associated with a home automation and/or security system, the present disclosure may also provide for alternate means of providing approved guests with access to a home and various components of the home's security and/or automation system. For example, using a dedicated application on the guest's smartphone, a signal associated with the guest's smartphone may be identified and approved by the home automation system, such that the guest may gain access to the home, disarm the security system, operate other components of the home automation and/or security system, or the like, when the home automation system detects the signal emitted by the guest's smartphone. In this way, a guest may not be required to remember a code, but may instead gain more streamlined access to the home merely by having his phone with him. This method may also help to reduce security risks, as the guest may be less likely to give his phone to an unapproved guest than he may be to pass on a code.

Thus, the present disclosure may provide a method for security and/or automation systems, including receiving a reservation request for a reservation at a building from a guest; approving the reservation request; and automatically communicating a temporary guest code to the guest based at least in part on the approving, the temporary guest code granting access to the building and access to operate at least one component of the security and/or automation system.

In some examples, the reservation request may include a duration of time for which the guest is approved to access the building. In some examples, the method may further include determining that the duration of time for which the guest is approved to access the building has ended, and automatically deactivating the temporary guest code based at least in part on the determining. In some examples, the method may further still include providing an alert to an administrator based at least in part on the deactivating. In some examples, the method may further include updating a status of the security and/or automation system based at least in part on the deactivating. In some examples, updating the status of the security and/or automation system may further include updating the security system to an armed state.

In some examples, the method may further include receiving a reservation extension request from the guest; approving the reservation extension request; and reactivating the temporary guest code or communicating a new temporary guest code to the guest based at least in part on the approving.

In some examples, approving the reservation request may include any of receiving a payment from the guest, or receiving approval from an administrator, or a combination thereof.

In some examples, the method may further include detecting an input of the temporary guest code at the building, and providing an alert to an administrator based at least in part on the detecting. In some examples, the temporary guest code may be inputted as any of a spoken command, or a gesture, or a wireless signal associated with a device carried by the guest, or an input at a user interface associated with the building, or a combination thereof.

In some examples, the at least one component of the security and/or automation system may include any of a motion sensor, or a video and/or audio monitor, or a plurality of lights, or an HVAC system, or a control panel, or a combination thereof.

In some examples, the temporary guest code may include any of a numeric or alphanumeric word, or code, or phrase, or a combination thereof.

In some examples, communicating the temporary guest code to the guest may further include communicating the temporary guest code to an email address associated with the guest, or to a cellphone associated with the guest as a push notification or text message, or to a dedicated application on a computing device associated with the guest, or a combination thereof.

The present disclosure may also relate to an apparatus for security and/or automation systems, including a processor, memory in electronic communication with the processor, and instructions stored in the memory. In some examples, the instructions may be executable by the processor to receive a reservation request for a reservation at a building from a guest; approve the reservation request; and automatically communicate a temporary guest code to the guest based at least in part on the approving. In some examples, the temporary guest code may grant access to the building and access to operate at least one component of the security and/or automation system.

The present disclosure may also relate to a non-transitory computer-readable medium storing computer-executable code. In some examples, the code may be executable by the processor to receive a reservation request for a reservation at a building from a guest; approve the reservation request; and automatically communicate a temporary guest code to the guest based at least in part on the approving. In some examples, the temporary guest code may grant access to the building and access to operate at least one component of the security and/or automation system.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

A system providing temporary guest codes to provide access to and operation of components of home automation and/or security systems is described below. Under existing systems, a guest wishing to access a rented property may be required to obtain a key or code from the property owner. Other existing systems may provide for automatic communication of an access code to the guest, but may not provide access to other components of an automation and/or security system associated with the rented property. The present disclosure provides a method by which a guest may automatically obtain a temporary guest code to provide access to the property and to provide access to operation of one or more components of the home automation and/or security system.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

Figure 1:
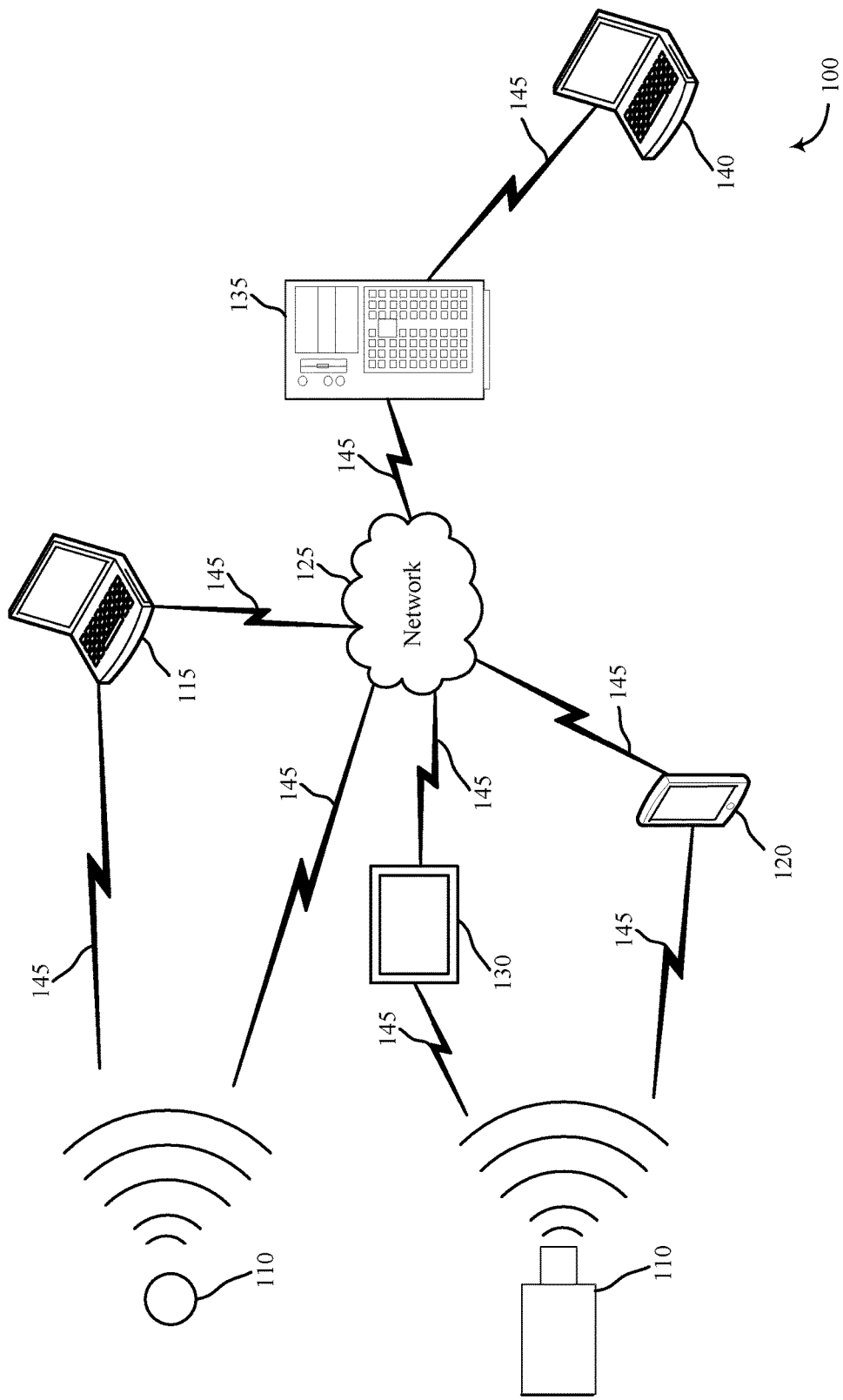
FIG. 1 shows a block diagram relating to an example of a home security and/or automation system, in accordance with various aspects of this disclosure.

FIG. 1 is an example of a security and/or automation system 100 in accordance with various aspects of this disclosure. In some embodiments, the security and/or automation system 100 may include one or more sensor units 110, local computing device 115, 120, network 125, server 135, control panel 130, and remote computing device 140. One or more sensor units 110 may communicate via wired or wireless communication links 145 with one or more of the local computing device 115, 120 or network 125. The network 125 may communicate via wired or wireless communication links 145 with the control panel 130 and the remote computing device 140 via server 135. In alternate embodiments, the network 125 may be integrated with any one of the local computing device 115, 120, server 135, or remote computing device 140, such that separate components are not required.

Local computing device 115, 120 and remote computing device 140 may be custom computing entities configured to interact with one or more sensor units 110 via network 125, and in some embodiments, via server 135. In other embodiments, local computing device 115, 120 and remote computing device 140 may be general purpose computing entities such as a personal computing device, for example, a desktop computer, a laptop computer, a netbook, a tablet personal computer (PC), a control panel, an indicator panel, a multi-site dashboard, an iPod®, an iPad®, a smartphone, a mobile phone, a personal digital assistant (PDA), a smartwatch, a wearable electronic device, and/or any other suitable device operable to send and receive signals, store and retrieve data, and/or execute modules.

Control panel 130 may be a smart home system panel, for example, an interactive panel mounted on a wall in an occupant's home. Control panel 130 may be in direct communication via wired or wireless communication links 145 with the one or more sensor units 110, or may receive sensor data from the one or more sensor units 110 via local computing devices 115, 120 and network 125, or may receive data via remote computing device 140, server 135, and network 125.

The local computing devices 115, 120 may include memory, a processor, an output, a data input, and a communication module. The processor may be a general purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some embodiments, the local computing devices 115, 120 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, receiving and displaying data from one or more sensor units 110.

The processor of the local computing devices 115, 120 may be operable to control operation of the output of the local computing devices 115, 120. The output may be a television, a liquid crystal display (LCD) monitor, a cathode ray tube (CRT) monitor, speaker, tactile output device, and/or the like. In some embodiments, the output may be an integral component of the local computing devices 115, 120. Similarly stated, the output may be directly coupled to the processor. For example, the output may be the integral display of a tablet and/or smartphone. In some embodiments, an output module may include, for example, a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the local computing devices 115, 120 to the output.

The remote computing device 140 may be a computing entity operable to enable a guest to submit a reservation request in some examples, or may be operable to enable a homeowner or property manager to monitor the output of the sensor units 110 in other examples. The remote computing device 140 may be functionally and/or structurally similar to the local computing devices 115, 120 and may be operable to receive data streams from and/or send signals to at least one of the one or more sensor units 110 via the network 125. The network 125 may be the Internet, an intranet, a personal area network, a local area network (LAN), a wide area network (WAN), a virtual network, a telecommunications network implemented as a wired network and/or wireless network, etc. The remote computing device 140 may receive and/or send signals over the network 125 via wireless communication links 145 and server 135.

In some embodiments, the one or more sensor units 110 may be sensors configured to conduct periodic or ongoing automatic functions (e.g., identifications, determinations, measurements, etc.) associated with a monitored guest in the rented building. In some examples, at least one of the one or more sensor units 110 may be a freestanding video monitoring device, or may be a video monitoring component of the home automation and/or security system. Each sensor unit 110 may be capable of sensing one or more physiological, audio, video, environmental, wireless signal, and/or motion parameters (among other things) associated with the monitored guest, or alternatively, separate sensor units 110 may monitor separate parameters associated with the monitored guest. For example, one sensor unit 110 may measure audio, for example by detecting the sound of the monitored guest opening a door or otherwise entering the home, and/or the like, while another sensor unit 110 (or, in some embodiments, a different element of the same sensor unit 110) may be a video monitor configured to record entrance or movement of guests in the home. In some embodiments, one or more sensor units 110 may additionally monitor alternative parameters associated with the monitored home occupant, such as motion, vibration, audio, wireless signals emitted by devices associated with the home occupant, and the like.

Data gathered by the one or more sensor units 110 may be communicated to local computing device 115, 120, which may be, in some embodiments, a thermostat or other wall-mounted input/output smart home display. In other embodiments, local computing device 115, 120 may be a personal computer or a smartphone, among other things. The local computing device 115, 120 may process the data received from the one or more sensor units 110, or may forward the data directly on to remote computing device 140. In some embodiments, remote computing device 140 may process the data received from the one or more sensor units 110, via network 125 and server 135. Data transmission may occur via, for example, frequencies appropriate for a personal area network (such as BLUETOOTH® or IR communications) or local or wide area network frequencies such as radio frequencies specified by the IEEE 802.15.4 standard, among others.

In some embodiments, local computing device 115, 120 may communicate with remote computing device 140 or control panel 130 via network 125 and server 135. Examples of networks 125 include cloud networks, local area networks (LAN), wide area networks (WAN), virtual private networks (VPN), wireless networks (using 802.11, for example), and/or cellular networks (using 3G and/or LTE, for example), etc. In some configurations, the network 125 may include the Internet. In some embodiments, an occupant may access the functions of local computing device 115, 120 from remote computing device 140. For example, in some embodiments, remote computing device 140 may include a mobile application that interfaces with one or more functions of local computing device 115, 120.

The server 135 may be configured to communicate with the one or more sensor units 110, the local computing devices 115, 120, the remote computing device 140, and control panel 130. The server 135 may perform additional processing on signals received from the one or more sensor units 110 or local computing devices 115, 120, or may simply forward the received information to the remote computing device 140 and control panel 130.

Server 135 may be a computing device operable to receive data streams (e.g., from one or more sensor units 110 and/or local computing device 115, 120 or remote computing device 140), store and/or process data, and/or transmit data and/or data summaries (e.g., to remote computing device 140). For example, server 135 may receive a stream of video data (among other data types) from a sensor unit 110, a stream of occupancy data from the same or a different sensor unit 110, and a stream of wireless signal data from a personal computing device associated with the guest (among other data types) from either the same or yet another sensor unit 110. In some embodiments, server 135 may "pull" the data streams, e.g., by querying the sensor units 110, the local computing devices 115, 120, and/or the control panel 130. In some embodiments, the data streams may be "pushed" from the sensor units 110 and/or the local computing devices 115, 120 to the server 135. For example, the sensor units 110 and/or the local computing device 115, 120 may be configured to transmit data as it is generated by or entered into that device. In some instances, the sensor units 110 and/or the local computing devices 115, 120 may periodically transmit data (e.g., as a block of data or as one or more data points).

The server 135 may include a database (e.g., in memory) containing audio, video, physiological, occupancy, profile, medical, past monitoring action(s), and/or other data received from the sensor units 110 and/or the local computing devices 115, 120, among other components. Additionally, as described in further detail herein, software (e.g., stored in memory) may be executed on a processor of the server 135. Such software (executed on the processor) may be operable to cause the server 135 to monitor, process, summarize, present, and/or send a signal associated with the monitored guest.

Figure 2:
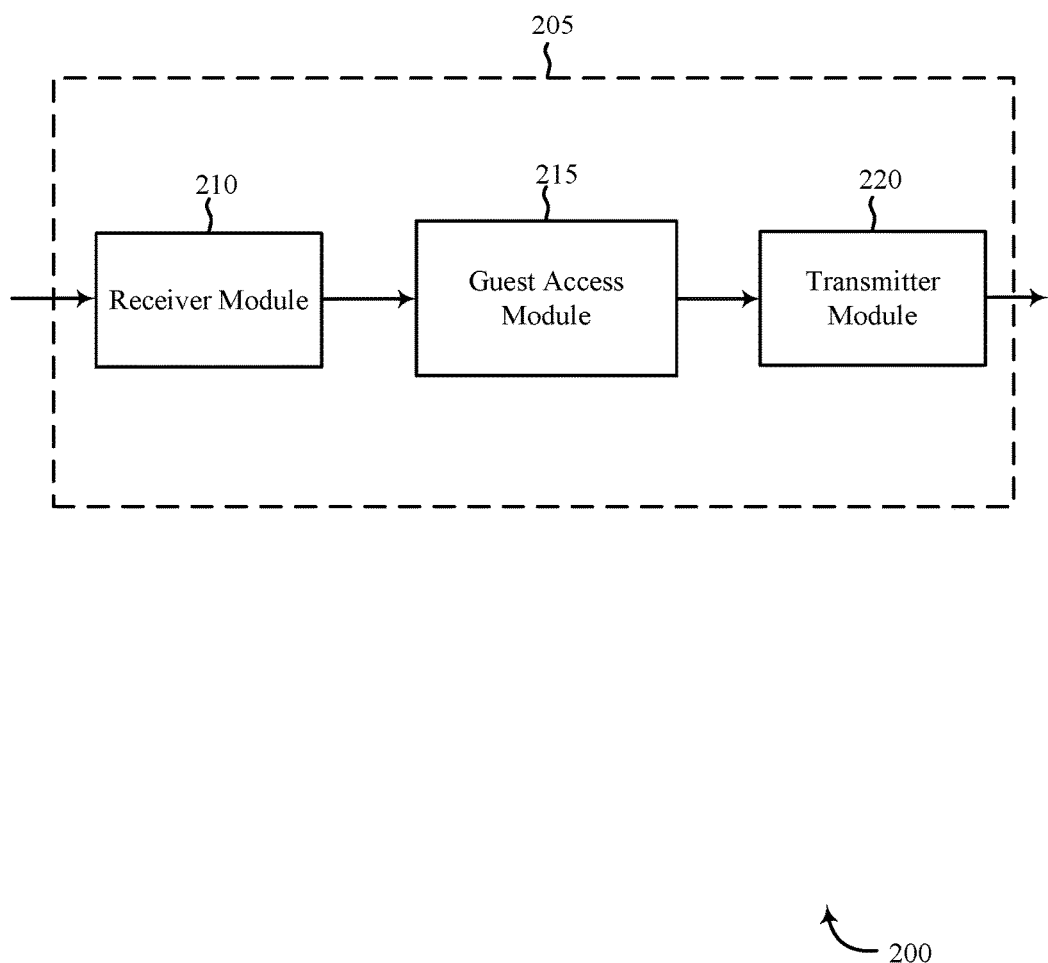
FIG. 2 shows a block diagram of a device relating to a home security and/or automation system, in accordance with various aspects of this disclosure.

FIG. 2 shows a block diagram 200 of an apparatus 205 for use in security and/or automation systems, in accordance with various aspects of this disclosure. The apparatus 205 may be an example of one or more aspects of any of a control panel 130, local computing device 115, 120, and/or remote computing device 140 described with reference to FIG. 1, among others. The apparatus 205 may include a receiver module 210, a guest access module 215, and/or a transmitter module 220. The apparatus 205 may also be or include a processor. Each of these modules may be in communication with each other, directly and/or indirectly.

The components of the apparatus 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 210 may receive information such as packets, reservation data, and/or control information associated with various information channels (e.g., control channels, data channels, etc.). In some embodiments, where the receiver module 210 is an example of one or more aspects of the local computing device 115, 120, control panel 130, or remote computing device 140, the receiver module 210 may be configured to receive a reservation request for a reservation at a building from a guest. For example, a guest may visit a website associated with personal or commercial home rentals, or a website associated with a hotel, bed-and-breakfast, or inn, or the like, and may input a request for a reservation. In other examples, the guest may utilize a dedicated application associated with booking hotel or homestay reservations on his smartphone, tablet, or other personal computing device. The reservation request may include proposed dates of stay, and may include payment information from the guest, such as a credit card number or direct deposit bank account information. Information related to the guest reservation may be received directly at receiver module 210 where apparatus 205 is the device into which the guest enters the reservation request, or in other embodiments, receiver module 210 may receive the guest reservation and related data via a network or a wired or wireless connection through which the data is communicated from the device into which the guest inputs the reservation request and related data.

The receiver module 210 may also be configured to receive information associated with the guest's stay once he or she arrives at the rented building. For example, receiver module 210 may receive data from a control panel associated with the automation and/or security system for the building indicating that the guest has inputted a temporary guest code received as a result of his inputted reservation request being approved. The guest may input the temporary guest code at a user interface, such as a keypad, on a component of the automation and/or security system, such as a control panel, in some examples. In other examples, one or more sensor units may detect the guest speaking a verbal passcode, password, or phrase. In still other examples, the same or separate one or more sensor units may detect a wireless signal associated with a computing device registered to the guest, where the wireless signal for the computing device may serve in lieu of or in addition to a temporary guest code to identify the guest at the building.

The receiver module 210 may further be configured to receive a reservation request approval, for example inputted by the home owner at apparatus 205 in some examples, or communicated to apparatus 205 from another computing device or dedicated application into which the home owner inputs the reservation approval. In other examples, discussed in more detail below, guest access module 215 may automatically approve the reservation request, without the need for input from the home owner.

In further examples, the receiver module 210 may be configured to receive a pre-recorded message or instructions from the home owner, to be communicated to the guest upon check-in. The pre-recorded message may be any of a video, audio, and/or textual message, and may be recorded by the home owner at apparatus 205 in some examples, or may be recorded at a control panel, local computing device, or remote computing device and communicated to the apparatus 205. This embodiment is discussed in more detail below with respect to the message module 450 described in FIG. 4.

Guest access module 215 may be configured to perform a plurality of operations, including approving reservation requests, issuing temporary guest codes, granting access to the reserved building, or granting access to operation of one or more systems associated with the building, or a combination thereof. For example, guest access module 215 may receive a reservation request from a guest via receiver module 210. As previously discussed, where apparatus 205 is an example of a local or remote computing device, the guest may have inputted the reservation request directly at apparatus 205. In other examples, the guest may have inputted the reservation request at a personal computing device or dedicated application, and the reservation request may have been communicated to guest access module 215 via receiver module 210 over a wireless or wired link, for example via a Wi-Fi signal and a network. The other functionalities of guest access module 215 are discussed in more detail below with respect to FIG. 3.

The transmitter module 220 may transmit the one or more signals received from other components of the apparatus 205. In some examples, the transmitter module 220 may transmit data received from receiver module 210 directly to a control panel and/or individual components of the home automation and/or security system without further processing by guest access module 215, or in other examples may transmit operation instructions associated with guest access functionalities derived at guest access module 215 to the appropriate component of the automation and/or security system. In some examples, the transmitter module 220 may be collocated with the receiver module 210 in a transceiver module. Data or signals transmitted from transmitter module 220 may be received at one or more components of the automation system, such as a control panel or other component of the home automation and/or security system, or may be received at a smartphone or a personal computing device for further processing before communicating an operation instruction to the one or more components of the automation system.

Figure 3:
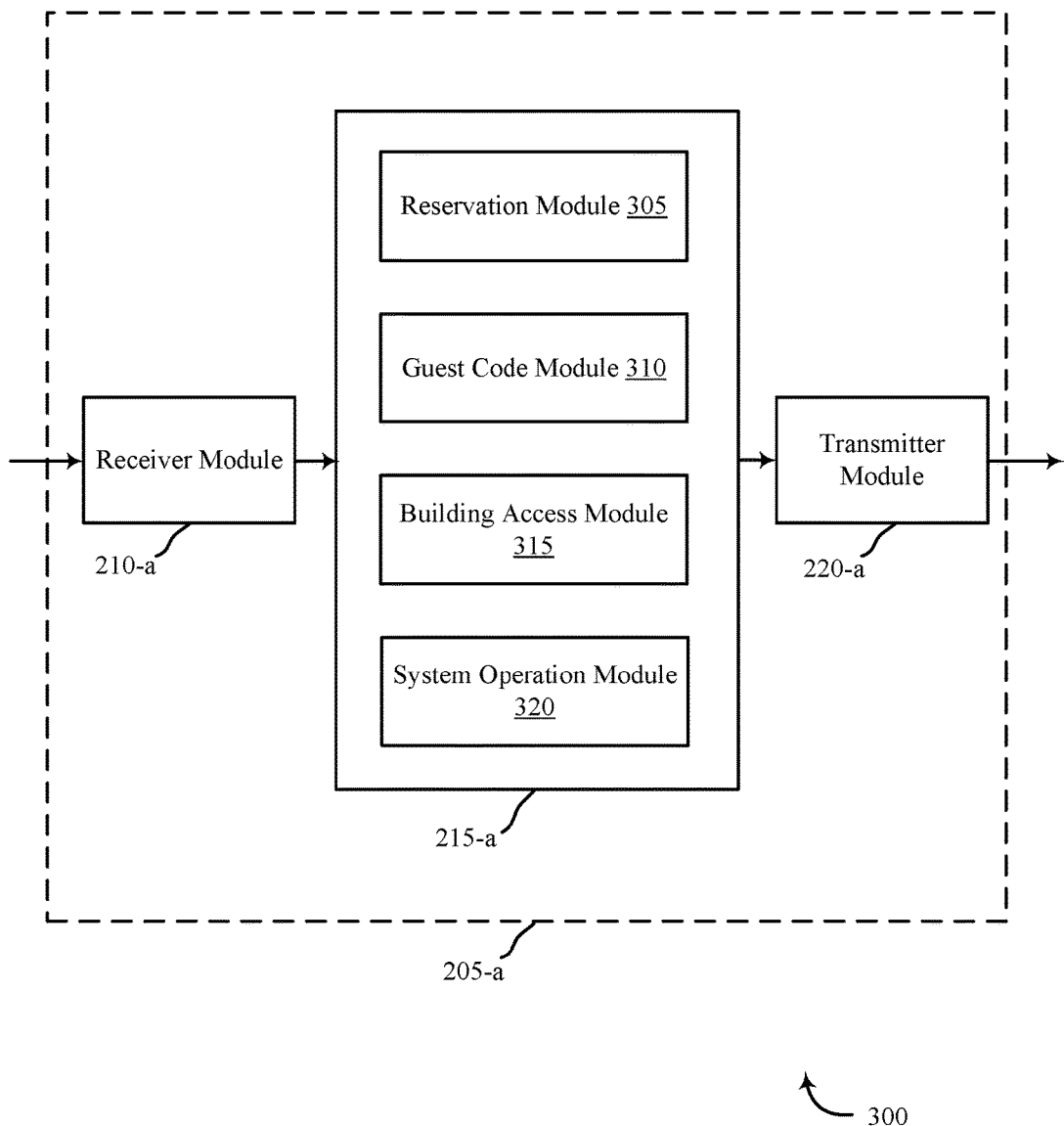
FIG. 3 shows a block diagram of a device relating to a home security and/or automation system, in accordance with various aspects of this disclosure.

FIG. 3 shows a block diagram 300 of an apparatus 205-a for use in automation and/or security systems, in accordance with various examples. The apparatus 205-a may be an example of one or more aspects of any of a control panel 130, local computing device 115, 120, and/or remote computing device 140 described with reference to FIG. 1, among others. The apparatus 205-a may also be an example of an apparatus 205 described with reference to FIG. 2. The apparatus 205-a may include a receiver module 210-a, a guest access module 215-a, and/or a transmitter module 220-a, which may be examples of the corresponding modules of apparatus 205. The apparatus 205-a may also include a processor. Each of these components may be in communication with each other. The guest access module 215-*a* may include one or more of a reservation module 305, a guest code module 310, a building access module 315, and/or a system operation module 320. The receiver module 210-*a* and the transmitter module 220-*a* may perform the functions of the receiver module 210 and the transmitter module 220 of FIG. 2, respectively.

The components of the apparatus 205-*a* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

In some examples, where apparatus 205-*a* is an example of a component of any of a control panel, local computing device, or remote computing device, receiver module 210-*a* may be configured to receive guest reservation requests, for example by receiving a wired or wireless transmission of reservation request data from a remote computing device into which the guest has entered the reservation request. Receiver module 210-*a* may further be configured to receive reservation approvals from the home owner, guest data associated with the guest's attempt at accessing the building or one or more components of the security and/or automation system associated with the building, and/or a pre-recorded message from the home owner for broadcasting to the guest, as described in more detail above with respect to FIG. 2.

In any example, upon receiving or detecting data associated with the guest and/or the guest's reservation, receiver module 210-*a* may communicate this data to guest access module 215-*a*. In some examples, reservation module 305 may receive the reservation request inputted by the guest. For example, the guest may have submitted a reservation request for a week's stay at a privately owned home, where the reservation was submitted through a dedicated application on the guest's smartphone. The reservation request may be communicated via a network and wired or wireless communication links to receiver module 210-*a*, for example where apparatus 205-*a* is an example of a control panel. Reservation module 305 may process the reservation request at apparatus 205-*a* to derive a reservation request approval in some examples, or may pass the reservation request along to the homeowner, for example for display on a personal computing device associated with the homeowner, to allow the homeowner to approve or deny the reservation request in other examples.

In the former example, where reservation module 305 derives a reservation approval locally, reservation module 305 may compare the reservation request dates with a calendar, where the calendar may be accessed from the homeowner's personal calendar via wired or wireless communication with the homeowner's personal computing device in some examples, or where the calendar may be uploaded directly to the apparatus 205-*a* by the homeowner in other examples. In some examples, reservation module 305 may approve the reservation request based on comparing the reservation request with the homeowner's calendar. In other examples, reservation module 305 may further require approval of the guest's submitted payment, as either a deposit or full amount due, prior to issuing a reservation approval. For example, where the guest has submitted a credit card number with the reservation request, reservation module 305 may communicate with the credit card company associated with the credit card number, for example via a network and a wired or wireless connection, to request payment approval. In other examples, where the guest has submitted bank routing and account details for direct payment, reservation module 305*m* ay communicate with the bank associated with the routing and account details to request approval of funds transfer. Where reservation module 305 receives confirmation of payment or funds from the credit card company or bank, reservation module 305 may approve the reservation request. In some examples, reservation module 305 may communicate this reservation approval to the guest, via transmitter module 220-*a*, to be received by the guest, for example, at a remote computing device. In other examples, where the credit card company or bank is not able to approve the payment or funds, or where the requested reservation dates conflict with other reservations in the homeowner's calendar, reservation module may communicate a reservation request rejection via transmitter module 220-*a* to the guest.

Where reservation module 305 has approved the reservation request, the approval may be communicated to guest code module 310. Guest code module 310 may be configured to derive a temporary guest code for use with the reservation associated with the guest. The temporary guest code may take the form of an alphanumeric code or phrase in some examples, while in other examples guest code module 310 may instead or in addition derive a personal computing device authentication link to be communicated to a personal computing device associated with the guest. In the former example, where guest code module 310 derives a temporary guest code, the guest code may be communicated to the guest via transmitter module 220-*a*. In some examples, the guest code may be communicated immediately to the guest, along with or following confirmation of approval of the reservation request. The reservation request approval and/or guest code may be communicated, for example, via email or SMS text message to a smartphone, tablet, or personal computing device associated with the guest. In other examples, the guest code may be communicated to the guest at a time closer to the date of the reservation, such as a week or day before the reservation commences, or at another appropriate time. In the latter example, where guest code module 310 derives a personal computing device authentication link, the authentication link may be communicated to the guest at his personal computing device, such as his smartphone or tablet. The guest may download or install the authentication link, which may register his device with the home automation and/or security system. By this registration, when the guest attempts to access the home or operate one or more components of the home automation and/or security system, the system may detect a wireless signal emitted from the device associated with the guest, and may grant the guest access to the home and/or operation of one or more components of the system based at least in part on approving the registration of the signal.

The guest code or signal registration derived by guest code module 310 may be temporary, and may be operable based on the dates of the approved reservation. For example, the guest code or signal registration may become active or operable only upon commencement of the reservation (at "check-in"), and may expire at the conclusion of the reservation (at "check-out"). In this way, a guest attempting to gain access to the home before or after his reservation may be unable to do so.

In some examples, a guest may wish to extend the length of his reservation after the reservation has already been approved, or may wish to request a late check-out on the final day of his reservation. The guest may input this reservation modification or extension request at a control panel in the home during his stay, in some examples, or at a dedicated application on his smartphone or on a website through his personal computing device in other examples. The reservation modification or extension request may be received, via receiver module 210-*a*, at reservation module 305. As discussed above, reservation module 305 may approve or deny the reservation modification or extension request locally, for example by comparing the request with the homeowner's calendar and/or by receiving payment verification, or may communicate the request to the homeowner via transmitter module 220-*a* for approval. Where the reservation modification or extension request is approved, guest code module 310 may extend the operability of the temporary guest code in some examples, or may issue a new temporary guest code in other examples.

Building access module 315 may be operable to detect use by the guest of the temporary guest code in some examples, or may detect a registered signal emitted from a personal computing device associated with the guest in other examples, in order to detect that the guest has attempted to gain access to the building. As previously discussed, the guest may input a code at a user interface, such as a control panel associated with the building in some examples, or may speak the code in other examples, where the spoken code is detected by one or more sensor units associated with the home automation and/or security system. Building access module 315 may compare the inputted guest code or wireless signal with a list of approved reservations, and may determine based on the comparing whether the guest code or wireless signal is currently approved. Based on this determination, building access module 315 may grant or deny access to the building, for example by communicating an instruction, via transmitter module 220-*a*, to one or more components of the home automation and/or security system to unlock one or more doors, disarm the security system, or the like. In some examples, the homeowner may input privacy preferences associated with the home automation and/or security system. For example, the homeowner may indicate that the guest code should permit access to the front door of the home, but not to the garage, or the like. In some examples, upon detection of an attempt by the guest to access the home, building access module 315 may communicate a notification, via transmitter module 220-*a*, to the homeowner, to notify him that the guest has attempted to access the home or building. The homeowner may receive the notification as an alert or push notification on his smartphone, as an email, as a text message, or the like.

System operation module 320 may similarly be operable to detect an attempt by the guest to operate one or more components of the home automation and/or security system. In some examples, the guest may only need to use the temporary guest code to gain access to the home or building, and may thereafter be able to operate one or more components of the home automation and/or security system without being required to input his temporary guest code. In other examples, the guest may be required to input his temporary guest code to access any component of the home automation and/or security system. System operation module 320 may compare the guest code or wireless signal from a computing device associated with the guest with a list of approved reservations (received upon entrance of the guest into the building and/or received when inputted by the guest to access the one or more components of the home automation and/or security system), and may determine whether the guest code or wireless signal is currently operable or approved. System operation module 320 may additionally consult a list of homeowner privacy preferences in order to determine to which components of the home automation and/or security system the guest has approved access. For example, the guest code may provide access to operation of the HVAC system in the home, but may not grant access to operation of the irrigation system, among other examples. System operation module 320 may also be operable to communicate a notification, via transmitter module 220-*a*, to the homeowner upon detecting that the guest has attempted to operate one or more component of the home automation and/or security system.

As discussed in more detail above with respect to FIG. 2, transmitter module 220-*a* may be operable to communicate any of an operation instruction to a lock or to a component of the home automation and/or security system associated with the building, a reservation request to a homeowner, a payment confirmation request to credit card company or bank, or a notification to a homeowner, or a combination thereof, among other examples.

Figure 4:
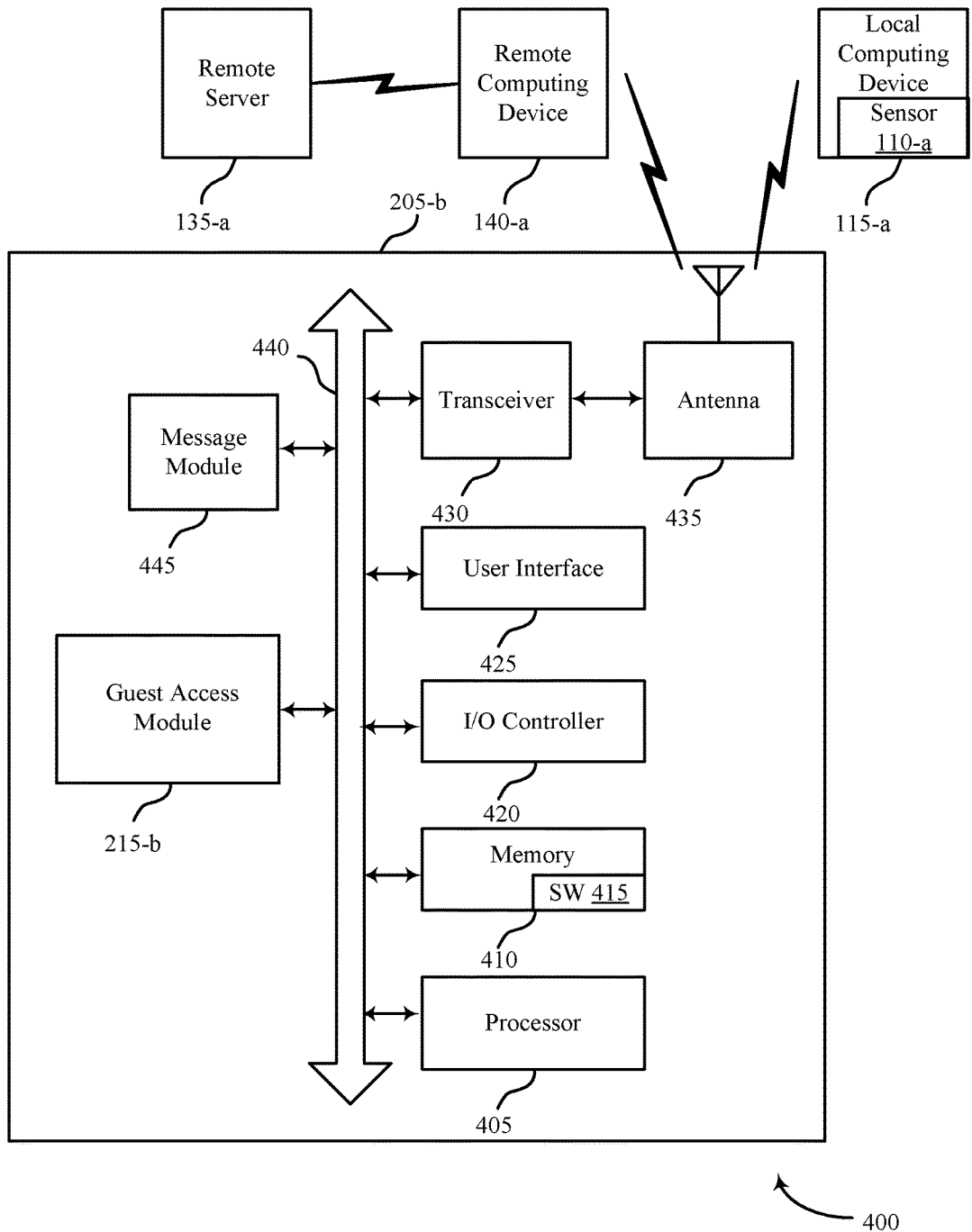
FIG. 4 shows a block diagram relating to a home security and/or automation system, in accordance with various aspects of this disclosure.

FIG. 4 shows a system 400 for use in security and/or automation systems, in accordance with various examples. System 400 may include an apparatus 205-*b*, which may be an example of one or more aspects of any of a control panel 130, local computing device 115, 120, and/or remote computing device 140 described with reference to FIG. 1, among others. Apparatus 205-*b* may also be an example of one or more aspects of apparatus 205 and/or 205-*a* of FIGS. 2 and 3.

Apparatus 205-*b* may include message module 445. Message module 445 may be operable to receive a prerecorded message from a homeowner, and may be further operable to communicate the prerecorded message to one or more component of the home automation and/or security system, or to a personal computing device associated with the guest, or a combination thereof. For example, a homeowner may record a video, audio, and/or text message welcoming the guest to her home and providing information related to the guest's stay or the home, to be played for the guest upon "check-in." The homeowner may record the message, in some examples, at a control panel or other component of the home automation and/or security system in some examples, or may record the message at a personal computing device or dedicated application in other examples, where the message in the latter example may be communicated to apparatus 205-*b* for storage and/or processing. Upon detecting that the guest has entered the home, for example by detecting use of the temporary guest code, or by detecting motion, vibration, or other occupancy-related parameters, for example using one or more senor units 110-*a*, message module 445 may play the pre-recorded message for the guest. For example, the guest may be displayed on a display screen of a control panel or other component of the home automation and/or security system, may be projected from one or more component of the home automation and/or security system, for example from a speaker unit or as a visual projection onto a wall or other surface, or may be communicated to a personal computing device associated with the guest, for example as an email or text message, among other examples.

Apparatus 205-*b* may also include components for bi-directional data communications including components for transmitting communications and components for receiving communications. For example, apparatus 205-*b* may communicate bi-directionally with one or more of local computing device 115-*a*, one or more sensor units 110-*a*, remote computing device 140-*a*, and/or remote server 135-*a*, which may be examples of the local computing device 115, one or more sensor units 110, and server 135 of FIG. 1, among others. This bi-directional communication may be direct (e.g., apparatus 205-*b* communicating directly with remote computing device 140-*a*) and/or indirect (e.g., apparatus 205-*b* communicating indirectly with remote server 135-*a* through remote computing device 140-*a*).

Apparatus 205-*b* may also include a processor module 405, and memory 410 (including software/firmware code (SW) 415), an input/output controller module 420, a user interface module 425, a transceiver module 430, and one or more antennas 435, each of which may communicate—directly or indirectly—with one another (e.g., via one or more buses 440). The transceiver module 430 may communicate bi-directionally—via the one or more antennas 435, wired links, and/or wireless links—with one or more networks or remote devices as described above. For example, the transceiver module 430 may communicate bi-directionally with one or more of local computing device 115-*a*, remote computing device 140-*a*, and/or remote server 135-*a*. The transceiver module 430 may include a modem to modulate the packets and provide the modulated packets to the one or more antennas 435 for transmission, and to demodulate packets received from the one or more antenna 435. While an apparatus (e.g., 205-*b*) may include a single antenna 435, the apparatus may also have multiple antennas 435 capable of concurrently transmitting or receiving multiple wired and/or wireless transmissions. In some embodiments, one element of apparatus 205-*b* (e.g., one or more antennas 435, transceiver module 430, etc.) may provide a direct connection to a remote server 135-*a* via a direct network link to the Internet via a POP (point of presence). In some embodiments, one element of apparatus 205-*b* (e.g., one or more antennas 435, transceiver module 430, etc.) may provide a connection using wireless techniques, including digital cellular telephone connection, Cellular Digital Packet Data (CDPD) connection, digital satellite data connection, and/or another connection.

The signals associated with system 400 may include wireless communication signals such as radio frequency, electromagnetics, local area network (LAN), wide area network (WAN), virtual private network (VPN), wireless network (using 802.11, for example), 345 MHz, Z-WAVE®, cellular network (using 3G and/or LTE, for example), and/or other signals. The one or more antennas 435 and/or transceiver module 430 may include or be related to, but are not limited to, WWAN (GSM, CDMA, and WCDMA), WLAN (including BLUETOOTH® and Wi-Fi), WMAN (WiMAX), antennas for mobile communications, antennas for Wireless Personal Area Network (WPAN) applications (including RFID and UWB). In some embodiments, each antenna 435 may receive signals or information specific and/or exclusive to itself. In other embodiments, each antenna 435 may receive signals or information not specific or exclusive to itself.

In some embodiments, one or more sensor units 110-*a* (e.g., motion, audio, video, physiological, and/or one or more other sensors) may connect to some element of system 400 via a network using one or more wired and/or wireless connections.

In some embodiments, the user interface module 425 may include an audio device, such as an external speaker system, an external display device such as a display screen, and/or an input device (e.g., remote control device interfaced with the user interface module 425 directly and/or through input/output controller module 420).

One or more buses 440 may allow data communication between one or more elements of apparatus 205-*b* (e.g., processor module 405, memory 410, input/output controller module 420, occupant interface module 425, etc.).

The memory 410 may include random access memory (RAM), read only memory (ROM), flash RAM, and/or other types. The memory 410 may store computer-readable, computer-executable software/firmware code 415 including instructions that, when executed, cause the processor module 405 to perform various functions described in this disclosure (e.g., receive a reservation request, approve the reservation request, communicate a temporary guest code to a guest based on the approving, etc.). Alternatively, the computer-readable, computer-executable software/firmware code 415 may not be directly executable by the processor module 405 but may be configured to cause a computer (e.g., when compiled and executed) to perform functions described herein. The processor module 405 may include an intelligent hardware device, e.g., a central processing unit (CPU), a microcontroller, an application-specific integrated circuit (ASIC), etc.

In some embodiments, the memory 410 may contain, among other things, the Basic Input-Output System (BIOS) which may control basic hardware and/or software operation such as the interaction with peripheral components or devices. For example, the message module 445 to implement the present systems and methods may be stored within the memory 410. Applications resident with system 400 are generally stored on and accessed via a non-transitory computer readable medium, such as a hard disk drive or other storage medium. Additionally, applications may be in the form of electronic signals modulated in accordance with the application and data communication technology when accessed via a network interface (e.g., transceiver module 430, one or more antennas 435, etc.).

Many other devices and/or subsystems may be connected to, or may be included as, one or more elements of system 400 (e.g., entertainment system, computing device, remote cameras, wireless key fob, wall mounted occupant interface device, cell radio module, battery, alarm siren, door lock, lighting system, thermostat, home appliance monitor, utility equipment monitor, and so on). In some embodiments, all of the elements shown in FIG. 4 need not be present to practice the present systems and methods. The devices and subsystems may be interconnected in different ways from that shown in FIG. 4. In some embodiments, an aspect of some operation of a system, such as that shown in FIG. 4, may be understood in the art and is not discussed in detail in this application. Code to implement the present disclosure may be stored in a non-transitory computer-readable medium such as one or more of memory 410 or other memory. The operating system provided on input/output controller module 420 may be iOS®, ANDROID®, MS-DOS®, MS-WINDOWS®, OS/2®, UNIX®, LINUX®, or another known operating system.

The transceiver module 430 may include a modem configured to modulate the packets and provide the modulated packets to the antennas 435 for transmission and/or to demodulate packets received from the antennas 435. While the apparatus (e.g., 205-*b*) may include a single antenna 435, the apparatus (e.g., 205-b) may have multiple antennas 435 capable of concurrently transmitting and/or receiving multiple wireless transmissions.

Figure 5A:
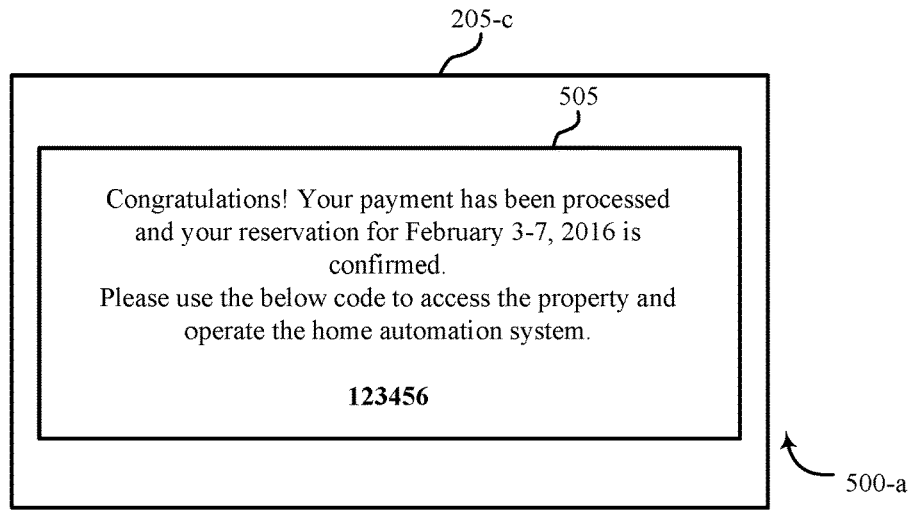
FIGS. 5A-5C show block diagrams illustrating example embodiments of a home security and/or automation system, in accordance with various aspects of this disclosure.
Figure 5B:
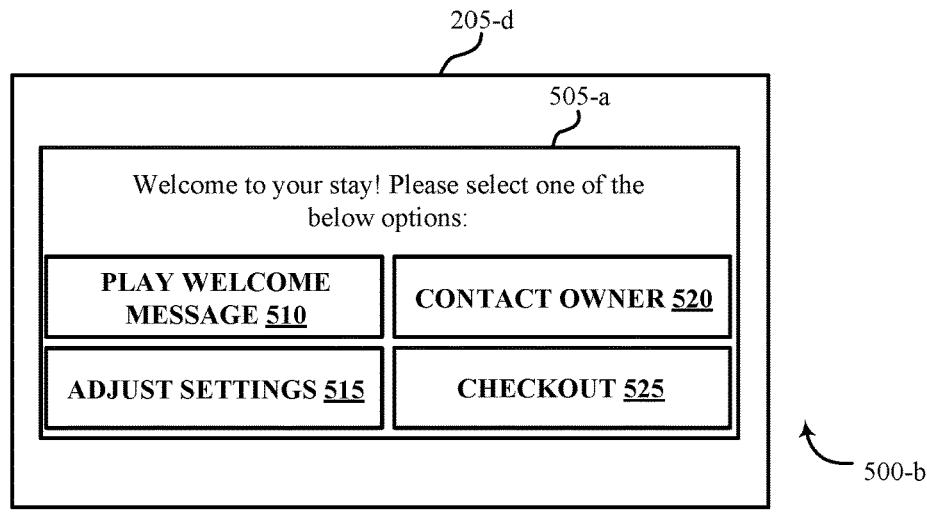
Figure 5C:
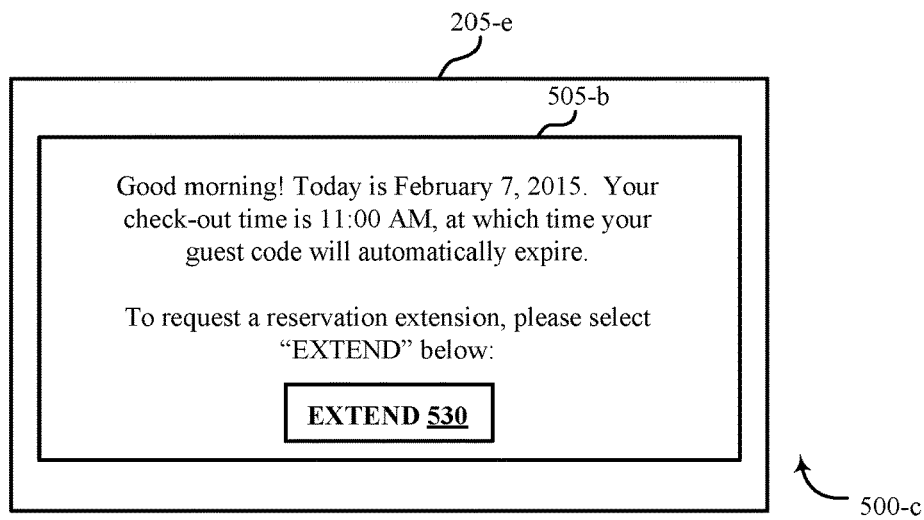

FIGS. 5A-5C are block diagrams illustrating examples of the security and/or automation system, in accordance with various embodiments described herein. In FIG. 5A, an example 500-a of a user interface 505 is illustrated. For example, a guest may have inputted a reservation request at apparatus 205-c, where apparatus 205-c may be an example of a component of a remote computing device, such as a smartphone, tablet, or personal computer, any of which may run a dedicated application associated with guest reservation requests. Upon approval of the reservation request, apparatus 205-c may display on a user interface 505 a confirmation message, including, in the illustrated example 500-a, payment and reservation details, and the temporary guest code. The guest may utilize the guest code to gain access to the building associated with the reservation, and may further use the code to operate at least one component of the security and/or automation system associated with the building. In some examples, the information illustrated in example 500-a may be communicated to the guest as a standard email or text message, or may be delivered as a push notification, among other examples.

FIG. 5B provides an example 500-b of a user interface 505-a. In the illustrated example 500-b, apparatus 205-d may be an example of a control panel associated with the reserved building in some embodiments, or may be an example of a component of a local or remote computing device, such as a smartphone, tablet, or personal computer, in other examples. In the illustrated example 500-b, user interface 505-a is displaying information pertinent to the guest's check-in. For example, the guest may have utilized his temporary guest code to access the building. The home automation and/or security system associated with the building may have detected the guest's use of his code and/or his presence in the building using occupancy monitoring data, and may display the information shown on user interface 505-a. In this example 500-b, user interface 505-a is illustrated as showing a welcome message to the guest, and providing a series of options from which the guest may select. For example, the guest may select "play welcome message" 510, "adjust settings" 515, "contact owner" 520, and "checkout" 525. Additional options may be provided in alternate embodiments. Thus, the guest may select the "play welcome message" 510 option to hear and/or see a prerecorded message from the homeowner regarding details about the house and the guest's stay. The guest may also or instead select the "adjust settings" 515 option, and may be presented on the user interface 505-a with a list of options to adjust one or more components associated with the home automation and/or security system, such as the HVAC, lighting, monitoring components, and the like. The guest may also or instead select the "contact owner" 520 option, and a two-way voice and/or audio call may be initiated between the apparatus 205-d and the homeowner, for example at a computing device associated with the homeowner. In other examples, the "contact owner" 520 option may allow the guest to input a typed message to be communicated to the homeowner. Finally, the guest may additionally or alternatively select the "checkout" 525 option. The "checkout" 525 option may serve in some examples to deactivate the temporary guest code, such that the guest may no longer gain access to the building and/or operate one or more components of the home automation and/or security system. The "checkout" 525 option may also or alternatively update a status of the security and/or automation system, for example to an "armed away" status so that the building is protected when the guest leaves. Other examples are also envisioned.

FIG. 5C provides an example 500-c of a user interface 505-b, on which a "checkout" related message may be conveyed to the guest at apparatus 205-e. In some examples, apparatus 205-e may be an example of a component of the home automation and/or security system, such as a control panel. In other examples, apparatus 205-e may be an example of a local or remote computing device associated with the guest, such as a smartphone, tablet, or other personal computing device, among others. For example, on the final day of the guest's reservation, a control panel associated with the home automation and/or security system may display a visual message on user interface 505-b notifying the guest of his check-out time, and giving him the option to request a reservation extension 530. By selecting the "extend" 530 option, a reservation extension request may be processed locally at apparatus 205-e in some examples, or may be communicated to the homeowner for approval in other examples. Where the extension request is approved, the operability of the guest's temporary guest code may be extended in some examples, or a new temporary guest code may be communicated to the guest in other examples, for example at user interface 505-b.

Figure 6:
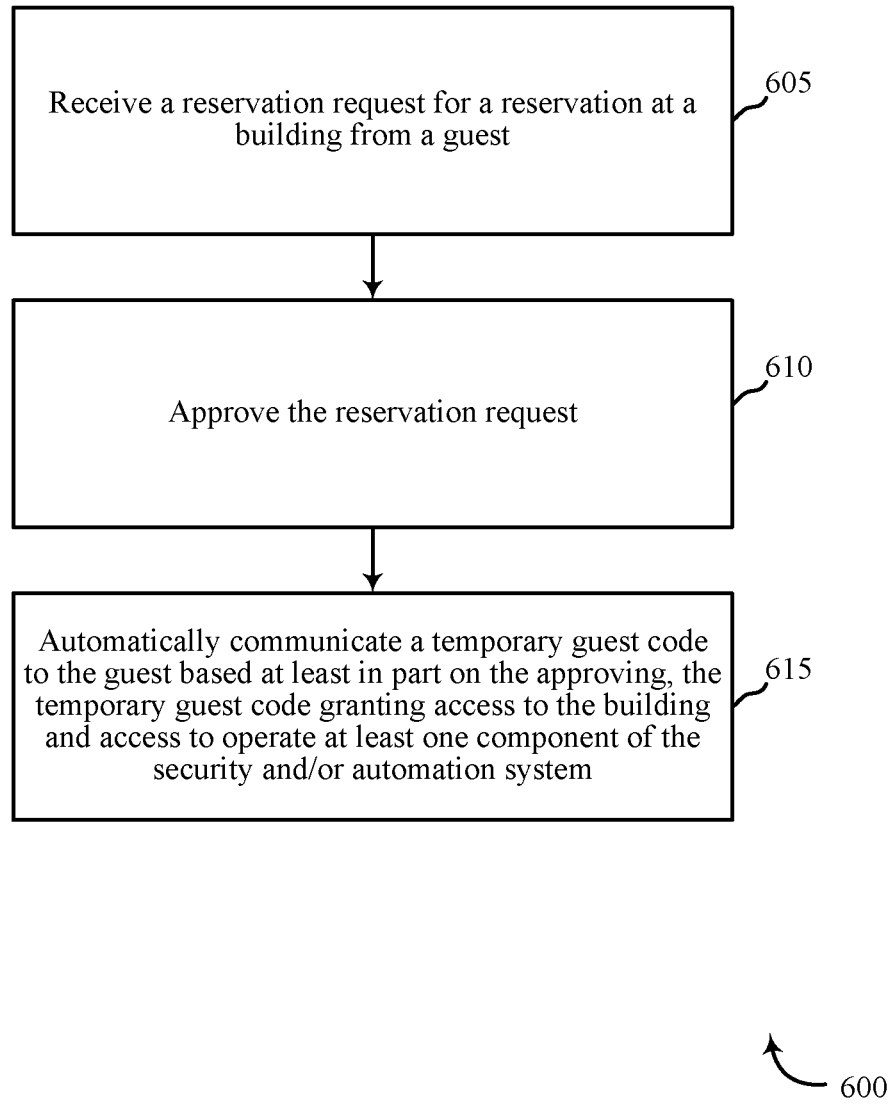
FIG. 6 is a flow chart illustrating an example of a method relating to a home security and/or automation system, in accordance with various aspects of this disclosure.

FIG. 6 is a flow chart illustrating an example of a method 600 for providing guest access to a home automation and/or security system, in accordance with various aspects of the present disclosure. For clarity, the method 600 is described below with reference to aspects of one or more of the sensor units 110, local computing devices 115, 120, control panel 130, or remote computing device 140 described with reference to FIG. 1, and/or aspects of apparatus 205, 205-a described with reference to FIGS. 2 and 3, among others. In some examples, a control panel may execute one or more sets of codes to control the functional elements of the one or more sensor units to perform the functions described below. Additionally or alternatively, the control panel may perform one or more of the functions described below using special-purpose hardware.

At block 605, the method 600 may include receiving a reservation request for a reservation at a building from a guest. As previously discussed, the reservation request may be inputted by the guest at a dedicated application or website on his personal computing device, among other examples. The reservation request may include details, such as the location and dates, associated with the reservation. In some examples, the reservation request may also include payment information from the guest, such as credit card or bank account information.

At block 610, the method 600 may include approving the reservation request. As previously discussed with respect to FIGS. 2 and 3, in some examples the reservation request may be processed and approved or denied locally at a local or remote computing device, while in other examples the reservation request may be communicated to the homeowner for review and approval. In further examples, approval of the reservation request may require authentication of payment details, for example by a bank or credit card company. Where the reservation request is approved by a computing device, the approval may be based at least in part on comparing the reservation request with a calendar associated with the building.

At block 615, the method 600 may include automatically communicating a temporary guest code to the guest based at least in part on the approving, the temporary guest code granting access to the building and access to operate at least one component of the security and/or automation system. As previously discussed, the temporary guest code may be in the form of an alphanumeric code or phrase in some examples, and may be communicated to the guest immediately upon approval of the reservation request or at a later time, closer to the date of the reservation. The code may be communicated to the guest as an email or text message in some examples, or as a push notification from a dedicated application in other examples. In some examples, the temporary guest code may instead include a registration and/or verification of a wireless signal emitted from a personal computing device associated with the guest. For example, the guest may carry a smartphone, and the wireless signal emitted from this smartphone may be registered and associated with the guest and his approved reservation, such that, upon detection of the wireless signal from the smartphone by one or more sensor units associated with the building, the guest's identity may be detected and verified, such that the guest is granted access to the building and access to operate at least one component of the security and/or automation system. The at least one component of the security and/or automation system may include an HVAC system, lights, monitoring components associated with the system, and/or the like.

Figure 7:
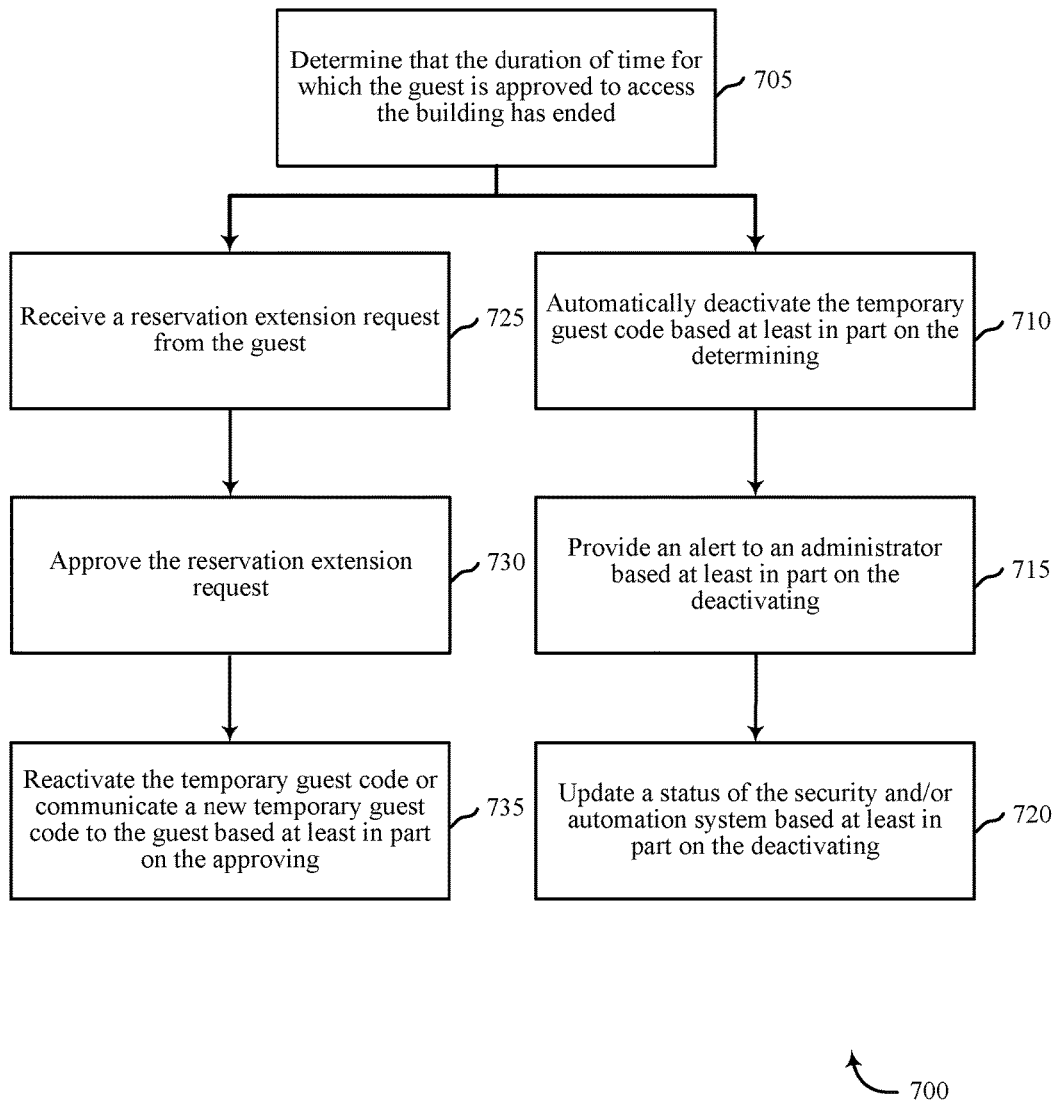
FIG. 7 is a flow chart illustrating an example of a method relating to a home security and/or automation system, in accordance with various aspects of this disclosure.

FIG. 7 is a flow chart illustrating an example of a method 700 for deactivating or extending the temporary guest code, according to various embodiments of the present disclosure. For clarity, the method 700 is described below with reference to aspects of one or more of the sensor units 110, local computing devices 115, 120, control panel 130, or remote computing device 140 described with reference to FIG. 1, and/or aspects of apparatus 205, 205-a described with reference to FIGS. 2 and 3, among others. In some examples, a control panel may execute one or more sets of codes to control the functional elements of the one or more sensor units to perform the functions described below. Additionally or alternatively, the control panel may perform one or more of the functions described below using special-purpose hardware.

At block 705, the method 700 may include determining that the duration of time for which the guest is approved to access the building has ended. This determination may be made based at least in part on the details of the reservation request. Method 700 may then continue to either block 725 or block 710.

At block 710, the method 700 may include automatically deactivating the temporary guest code based at least in part on the determining. By doing so, the guest may no longer gain access to the building and/or operate the at least one component of the security and/or automation system associated with the building.

At block 715, the method 700 may include providing an alert to an administrator based at least in part on the deactivating. For example, a notification message, in the form of an email or text message, or as a push notification from a dedicated application, or the like, may be communicated to the homeowner (administrator) at a computing device associated with the homeowner.

At block 720, the method 700 may include updating a status of the security and/or automation system based at least in part on the deactivating. For example, the security and/or automation system may have been in a disarmed state for the duration of the guest's stay. Upon conclusion of the guest's reservation, the security and/or automation system may be updated to an "armed away," "vacation," or other status. In this way, the building may be protected after the guest has checked out, without the need for the administrator or homeowner to visit the property to lockup and arm the system.

Alternatively, at block 705, the method 700 may continue to block 725. At block 725, the method 700 may include receiving a reservation extension request from the guest. For example, the guest may request a late checkout, or may wish to extend the duration of his stay for an additional day or more. This reservation extension request may be processed locally at a component of the home automation and/or security system in some examples, or may be communicated to the homeowner/administrator for review and approval in other examples. Where the reservation extension request is processed locally, without administrator input, the reservation extension request may be compared with administrator inputted preferences and the administrator's calendar in order to determine whether the request should be approved.

At block 730, the method 700 may include approving the reservation extension request. Again, the approval may be performed locally, or may be the result of an approval received from the administrator.

At block 735, the method 700 may include reactivating the temporary guest code or communicating a new temporary guest code to the guest based at least in part on the approving. In this way, the duration of time for which the guest is able to access the building and operate at least one component of the security and/or automation system may be extended. Where a new temporary guest code is derived, the new temporary guest code may be communicated to the guest at a component of the home automation system, such as a control panel, or may be communicated to the guest at a personal computing device associated with the guest, such as in the form of an email, text message, or push notification on the guest's smartphone or tablet, among other examples. Where the reservation extension request is not approved at block 730, the temporary guest code may remain expired, and the guest may not be able to gain further access to the building or the at least one component of the automation and/or security system.

In some examples, aspects from the methods 600 and 700 may be combined, omitted, and/or separated. It should be noted that the methods 600 and 700 are just example implementations, and that the operations of the methods 600 and 700 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for security and automation systems, comprising:

receiving a reservation request for a reservation at a single-family home from a guest;

receiving, based at least in part on the reservation request, input from a home manager of a security and automation system located at the single-family home, wherein the input comprises an authentication of availability at the single-family home for the reservation request based at least in part on calendar information and a configuration of the security and automation system for guest access;

approving the reservation request based at least in part on the received authentication of availability; and automatically communicating a temporary guest code to the guest triggered by the approving, wherein manually inputting the temporary guest code at a mounted component of the security and automation system located at the single-family home grants access to the single-family home and access to operate at least one component of the security and automation system, and updates a status of the security and automation system from an armed state to a disarmed state, wherein the armed state is associated with triggering an alarm.

2. The method of claim 1, wherein the reservation request comprises a duration of time for which the guest is approved to access the single-family home.

3. The method of claim 2, further comprising:
determining that the duration of time for which the guest is approved to access the single-family home has ended; and
automatically deactivating the temporary guest code based at least in part on the determining.

4. The method of claim 3, further comprising:
providing an alert to an administrator based at least in part on the deactivating.

5. The method of claim 3, further comprising:
receiving a reservation extension request from the guest;
approving the reservation extension request; and
reactivating the temporary guest code or communicating a new temporary guest code to the guest based at least in part on the approving.

6. The method of claim 3, further comprising:
updating a status of the security and automation system based at least in part on the deactivating.

7. The method of claim 6, wherein updating the status of the security and automation system further comprises:
updating the security system to an armed state.

8. The method of claim 1, wherein approving the reservation request comprises any of receiving a payment from the guest, or receiving approval from an administrator, or a combination thereof.

9. The method of claim 1, further comprising:
detecting an input of the temporary guest code at the single-family home; and
providing an alert to an administrator based at least in part on the detecting.

10. The method of claim 1, wherein the temporary guest code is further inputted as any of a spoken command, or a gesture, or a wireless signal associated with a device carried by the guest, or an input at a user interface associated with the single-family home, or a combination thereof.

11. The method of claim 1, wherein the at least one component of the security and automation system comprises any of a motion sensor, or a video and/or audio monitor, or a plurality of lights, or an HVAC system, or a control panel, or a combination thereof.

12. The method of claim 1, wherein the temporary guest code comprises any of a numeric or alphanumeric word, or code, or phrase, or a combination thereof.

13. The method of claim 1, wherein communicating the temporary guest code to the guest further comprises:
communicating the temporary guest code to an email address associated with the guest, or to cellphone associated with the guest as a push notification or text message, or to a dedicated application on a computing device associated with the guest, or a combination thereof.

14. An apparatus for security and automation systems, comprising:
a processor;
memory in electronic communication with the processor; and
instructions stored in the memory, the instructions being executable by the processor to:
receive a reservation request for a reservation at a single-family home from a guest;
receive, based at least in part on the reservation request, input from a home manager of a security and automation system located at the single-family home, wherein the input comprises an authentication of availability at the single-family home for the reservation request based at least in part on calendar information and a configuration of the security and automation system for guest access;
approve the reservation request based at least in part on the received authentication of availability; and
automatically communicate a temporary guest code to the guest triggered by the approving, wherein manually inputting the temporary guest code at a mounted component of the security and automation system grants access to the single-family home and access to operate at least one component of the security and automation system, and updates a status of the security and automation system from an armed state to a disarmed state, wherein the armed state is associated with triggering an alarm.

15. The apparatus of claim 14, wherein the reservation request comprises a duration of time for which the guest is approved to access the single-family home.

16. The apparatus of claim 15, the instructions further executable to:
determine that the duration of time for which the guest is approved to access the single-family home has ended; and
automatically deactivating the temporary guest code based at least in part on the determining.

17. The apparatus of claim 16, the instructions further executable to:
provide an alert to an administrator based at least in part on the deactivating.

18. The apparatus of claim 16, the instructions further executable to:
receive a reservation extension request from the guest;
approve the reservation extension request; and
reactivate the temporary guest code or communicating a new temporary guest code to the guest based at least in part on the approving.

19. The apparatus of claim 16, the instructions further executable to:
update a status of the security and automation system based at least in part on the deactivating.

20. A non-transitory computer-readable medium storing computer-executable code, the code executable by a processor to:
receive a reservation request for a reservation at a single-family home from a guest;

receive, based at least in part on the reservation request, input from a home manager of a security and automation system located at the single-family home, wherein the input comprises an authentication of availability at the single-family home for the reservation request based at least in part on calendar information and a configuration of the security and automation system for guest access;

approve the reservation request based at least in part on the received authentication of availability; and automatically communicate a temporary guest code to the guest triggered by the approving, wherein manually inputting the temporary guest code at a mounted component of the security and automation system grants access to the single-family home and access to operate at least one component of the security and automation system, and updates a status of the security and automation system from an armed state to a disarmed state, wherein the armed state is associated with triggering an alarm.

21. The method of claim 1, further comprising:

receiving at least one of a pre-recorded message or instructions from the home owner; and communicating the at least one of the pre-recorded message or the instructions to the guest upon check-in.

* * * * *